US 8,001,488 B1

(12) United States Patent
Lam

(10) Patent No.: US 8,001,488 B1
(45) Date of Patent: Aug. 16, 2011

(54) USER INTERFACE DIAL WITH DISPLAY

(75) Inventor: Lawrence Lam, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 774 days.

(21) Appl. No.: 10/159,712

(22) Filed: May 31, 2002

(51) Int. Cl.
*G06F 3/048* (2006.01)
*G09G 5/00* (2006.01)
(52) U.S. Cl. ........ 715/834; 715/810; 715/827; 715/780; 345/169; 345/156; 345/173
(58) Field of Classification Search .......... 715/761–765, 715/864, 866, 810, 786, 827, 834, 780; 345/184, 345/156, 169, 173
See application file for complete search history.

(56) References Cited

U.S. PATENT DOCUMENTS

| | | | |
|---|---|---|---|
| 5,821,935 A * | 10/1998 | Hartman et al. .............. | 715/839 |
| 6,201,540 B1 * | 3/2001 | Gallup et al. .................. | 715/764 |
| 6,359,838 B1 * | 3/2002 | Taylor ............................. | 368/13 |
| 6,445,306 B1 * | 9/2002 | Trovato et al. ............. | 340/12.25 |
| 6,463,304 B2 * | 10/2002 | Smethers ....................... | 455/566 |
| 6,556,222 B1 * | 4/2003 | Narayanaswami ........... | 715/786 |
| 6,580,932 B1 * | 6/2003 | Finke-Anlauff .............. | 455/566 |
| 6,593,914 B1 * | 7/2003 | Nuovo et al. .................. | 345/169 |
| 6,628,508 B2 * | 9/2003 | Lieu et al. ..................... | 361/680 |
| 6,704,032 B1 * | 3/2004 | Falcon et al. ................. | 715/746 |
| 6,707,387 B2 * | 3/2004 | Noguchi et al. ........... | 340/691.6 |
| 6,744,427 B2 * | 6/2004 | Maglio et al. ................. | 345/184 |
| 6,766,182 B2 * | 7/2004 | Janninck et al. ........... | 455/575.3 |
| 6,775,659 B2 * | 8/2004 | Clifton-Bligh .................... | 707/1 |
| 6,788,241 B2 * | 9/2004 | Arling et al. .................. | 341/176 |
| 6,810,271 B1 * | 10/2004 | Wood et al. ................... | 455/566 |
| 6,925,169 B2 * | 8/2005 | Habu ............................. | 379/368 |
| 6,925,611 B2 * | 8/2005 | SanGiovanni ................ | 715/834 |
| 6,952,601 B2 * | 10/2005 | Lieu et al. .................. | 455/575.1 |
| 6,967,642 B2 * | 11/2005 | SanGiovanni ................ | 715/702 |
| 2001/0048425 A1 * | 12/2001 | Partridge ....................... | 345/161 |
| 2002/0101458 A1 * | 8/2002 | SanGiovanni ................ | 345/863 |
| 2002/0122031 A1 * | 9/2002 | Maglio et al. ................. | 345/184 |
| 2002/0197064 A1 * | 12/2002 | Bijsmans et al. ................ | 386/96 |
| 2003/0095096 A1 * | 5/2003 | Robbin et al. ................ | 345/156 |
| 2003/0197736 A1 * | 10/2003 | Murphy ........................ | 345/780 |
| 2003/0197740 A1 * | 10/2003 | Reponen ....................... | 345/810 |
| 2003/0210224 A1 * | 11/2003 | Bartholomew et al. ....... | 345/156 |

* cited by examiner

*Primary Examiner* — Tadeese Hailu

(57) ABSTRACT

An interface dial with display. In one embodiment, a user interface is comprised of a display device for displaying images which is situated as part of a mechanical dial device. The display device is located in an inner portion of the mechanical interface dial. A rotatable outer ring can be coupled with and encompasses the inner portion. The rotatable outer ring is for triggering retrieval of images to be displayed in the display device. The icons displayed in the display device portion can change as the outer dial is rotated to allow selection of a displayed function by depressing the display device. The dial also provides four-way navigation having a rocker switch integrated therewith. Resembling a combination lock in one embodiment, the dial can also act as a security device.

25 Claims, 21 Drawing Sheets

1000

```
┌─────────────────────────────────────────────┐
│ GENERATING AN IMAGE OF AN ICON WITHIN AN INTERFACE │
│ DIAL WITH DISPLAY. THE ICON REPRESENTS A FUNCTION │
│     OPERABLE IN A PORTABLE ELECTRONIC DEVICE │
│                    1002                     │
└─────────────────────────────────────────────┘
                      │
                      ▼
┌─────────────────────────────────────────────┐
│  GENERATING A NEW IMAGE OF AN ALTERNATIVE ICON IN │
│    RESPONSE TO RECEIVING A ROTATION UPON AN OUTER │
│        ROTATING RING OF THE INTERFACE DIAL. │
│                    1004                     │
└─────────────────────────────────────────────┘
                      │
                      ▼
┌─────────────────────────────────────────────┐
│      ACTIVATING THE FUNCTION ASSOCIATED WITH THE │
│    DISPLAYED ICON, IN RESPONSE TO RECEIVING A COMMAND │
│ SIGNAL WITHIN THE INNER PORTION OF THE INTERFACE DIAL. │
│                    1006                     │
└─────────────────────────────────────────────┘
                      │
                      ▼
┌─────────────────────────────────────────────┐
│   PERFORMING CURSOR NAVIGATION BY THE INTERFACE OF A │
│ USER WITH A MULTI-WAY ROCKER SWITCH INTEGRATED WITH │
│              THE INTERFACE DIAL.            │
│                    1008                     │
└─────────────────────────────────────────────┘
```

FIGURE 10

USER INTERFACE DIAL WITH DISPLAY

FIELD OF THE INVENTION

The present invention relates to portable computer systems. More particularly, embodiments of the present invention provide an interface dial with display functionality for a portable computer system.

BACKGROUND OF THE INVENTION

As the continuing advances in technology have enabled the further miniaturization of the components required to build computer systems, new categories of computer systems have been created. One of the newer categories of computer systems developed has been the portable, palmtop, or "handheld" computer system, referred to as a personal digital assistant or PDA. Other examples of a handheld computer system include electronic address books, electronic day planners, electronic schedulers and the like.

A handheld computer system is a computer that is small enough to be held in the user's hand. As a result, handheld computers are readily carried about in a user's briefcase, purse, and in some instances, in a user's pocket. By virtue of its size, the handheld computer, being inherently lightweight, is therefore exceptionally portable and convenient.

Today's portable computer systems provide a user interface, with many systems utilizing a stylus or pen to enhance user interaction. In FIG. 1, an exemplary portable computer system 2 is shown with a display region 3 for displaying selectable icons representing functions of portable computer system 2.

In FIG. 2, portable computer system 2 is shown as having icons viewable within display region 3. The icons represent shortcuts to executable files of applications, functions, and programs that can be initiated. A user utilizes a stylus, or other appropriate device, to select and activate a desired application by touching the associated icon with the stylus. For example, a user desires to add information to their data book, and as such, touches date book icon 4.

Subsequent to the touching of a selected icon, e.g., data book icon 4, the associated application or function or program is activated. In this example, a date book application is activated, and a representation of a calendar 5 is generated, as shown in FIG. 3.

However, for a user to activate another application or function or program, e.g., using the mail program, the user commonly has to return to the main menu, as seen in FIG. 4, to then be able to select and activate the mail program, mail icon 6, as shown in FIG. 4. Disadvantageously, this requires a user to cease what they were doing at the time while locating the desired icon.

While an interface that mandates switching back and forth between a screen displaying an active application, function, or program, and a display screen to access a desired icon (as shown in FIGS. 2-4) may be acceptable to some, others may find this inconvenient and time consuming. Additionally, in those portable computer systems having more functions represented with icons where the total number of icons cannot fit within an available display screen, to access those icons not displayed, a user needs to scroll up or down to find the desired icons. This too may be acceptable to some, but others may find this inconvenient.

Thus a need exists for an apparatus that provides an interface for an electronic device that is operable independent of the display screen. Another need exists for an interface for an electronic device that meets the above listed need and which can invoke a function associated with an icon. Still another need exists for an interface for an electronic device that meets the above listed needs and which can easily and readily interact with the function once invoked.

SUMMARY OF THE INVENTION

Embodiments of the present invention provide an apparatus that provides an interface for an electronic device that is operable independent of the display of the electronic device in which it is implemented. The present invention further provides an interface that is able to viewably display icons representing functions that can be performed by an electronic device. The present invention further provides an interface that can activate the function associated with the icon displayed within the interface. The present invention further provides an interface which can easily and readily provide interaction within the activated function.

These and other objects and advantages of the present invention will no doubt become obvious to those of ordinary skill in the art after having read the following detailed description of the preferred embodiments which are illustrated in the various drawing figures.

In one embodiment, a user interface is comprised of a display device for displaying images which is situated as part of a mechanical dial device. The display device is located in an inner portion of the mechanical interface dial. A rotatable outer ring can be coupled with and encompasses the inner portion. The rotatable outer ring is for triggering retrieval of images to be displayed in the display device. The icons displayed in the display device portion can change as the outer dial is rotated to allow selection of a displayed function by depressing the display device. The dial also provides four-way navigation having a rocker switch integrated therewith. Resembling a combination lock in one embodiment, the dial can also act as a security device.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 10 is a flowchart of a process of utilizing an interface dial with display in accordance with one embodiment of the present invention.

DETAILED DESCRIPTION

Embodiments of the present invention are drawn to providing an interface dial with a display for a portable electronic device. In the following description, for purposes of explanation, numerous specific details are set forth in order to provide a thorough understanding of the present invention. To one skilled in the art, the present invention may be practiced without these specific details. In other instances, well-known structures and devices are shown in block diagram form in order to avoid obscuring the present invention.

The present invention is discussed primarily in the context of a portable electronic device such as a portable computer system, e.g., a handheld computer system or a personal digital assistant. For purposes of the present application, the term "portable computer system" is not intended to be limited solely to conventional handheld or portable computers. Instead, the term "portable computer" or "portable computer system" is also intended to include any mobile electronic device. Such mobile devices include but are not limited to pagers and paging systems, wireless and cellular telephones, electronic address books, wrist-mounted electronic devices, and numerous other mobile devices. As such, for purposes of the present application, the terms "portable computer" and "mobile device" will be considered synonymous and will be used interchangeably. Furthermore, embodiments of the present invention can be implemented with other types of electronic devices, including but not limited to a handheld computer system.

Figure 1:
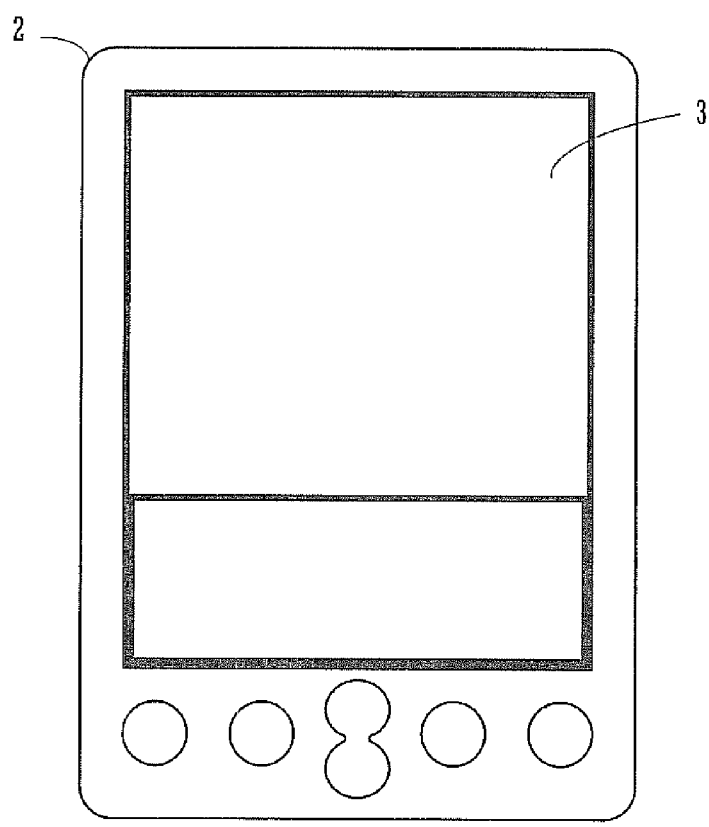
FIG. 1 is an illustration of an exemplary portable electronic device with a display region.
Figure 2:
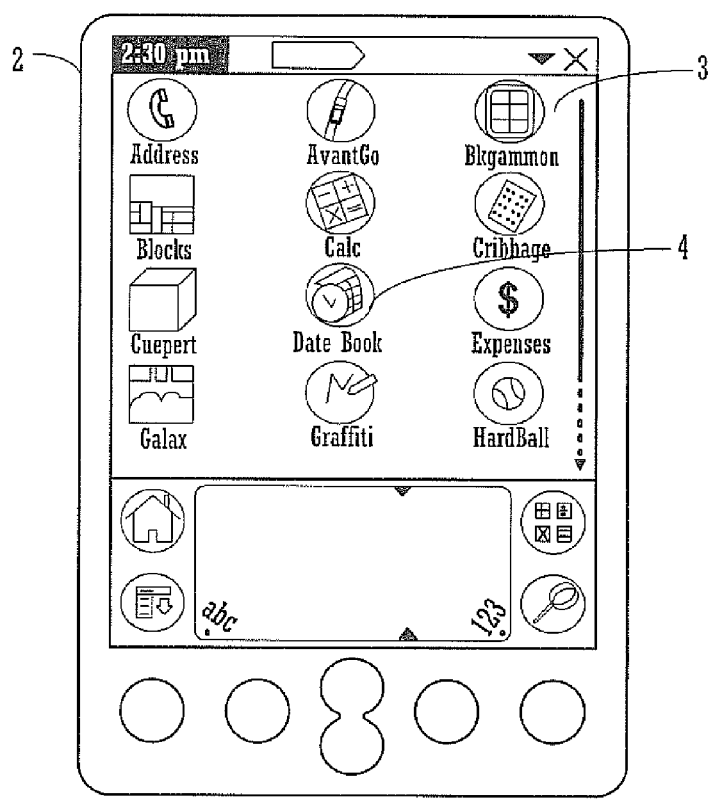
FIG. 2 is an illustration of an exemplary portable electronic device having a plurality of selectable icons, representing available functions of the electronic device, viewable in a display region.
Figure 3:
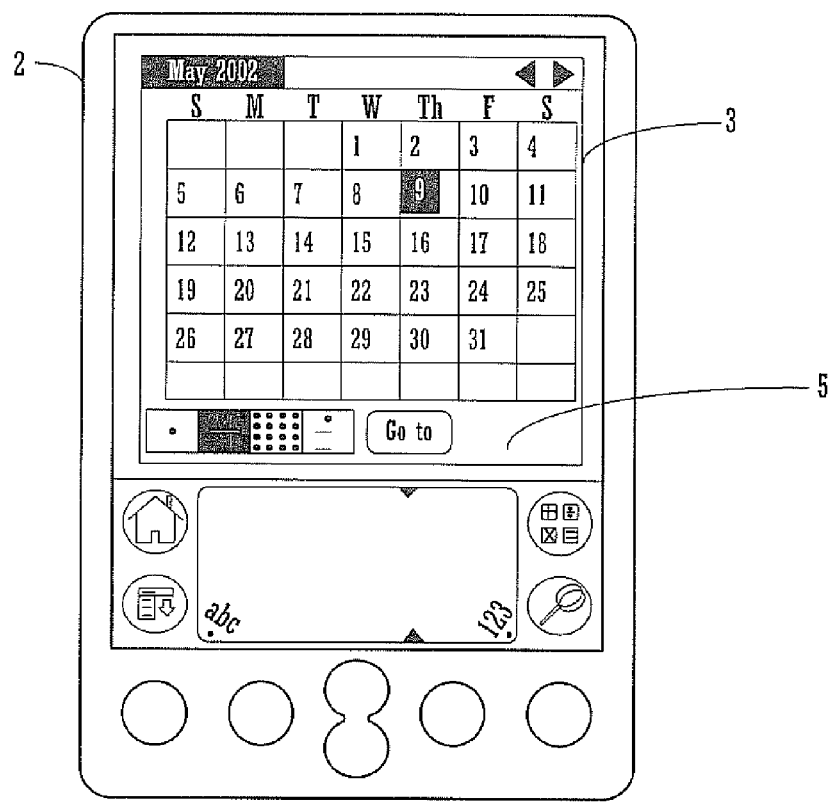
FIG. 3 is an illustration of an exemplary portable electronic device displaying an activated application associated with a selected icon.
Figure 4:
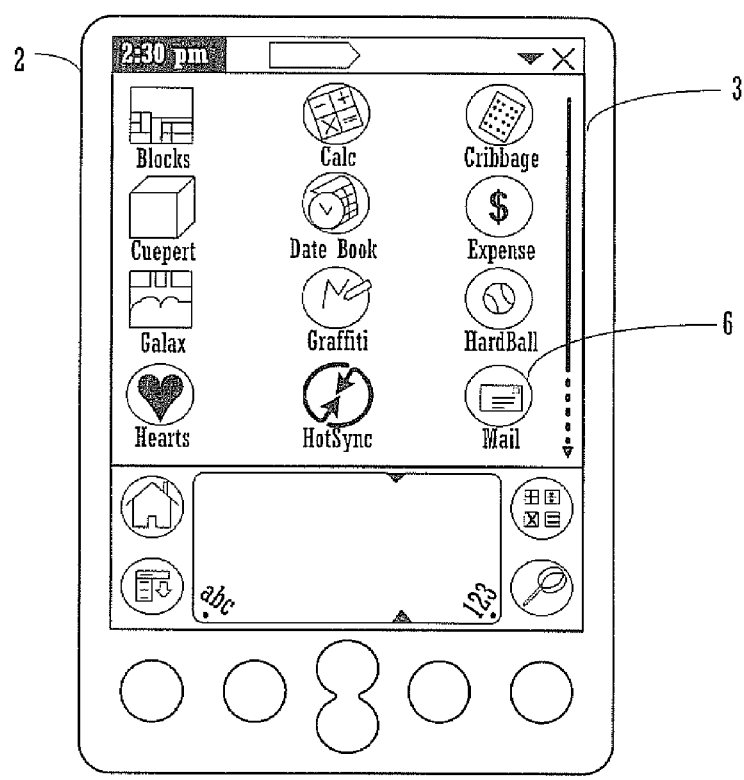
FIG. 4 is an illustration of an exemplary portable electronic device, analogous to the exemplary portable electronic device of FIG. 2, displaying multiple icons prior to selecting an available function.
Figure 5A:
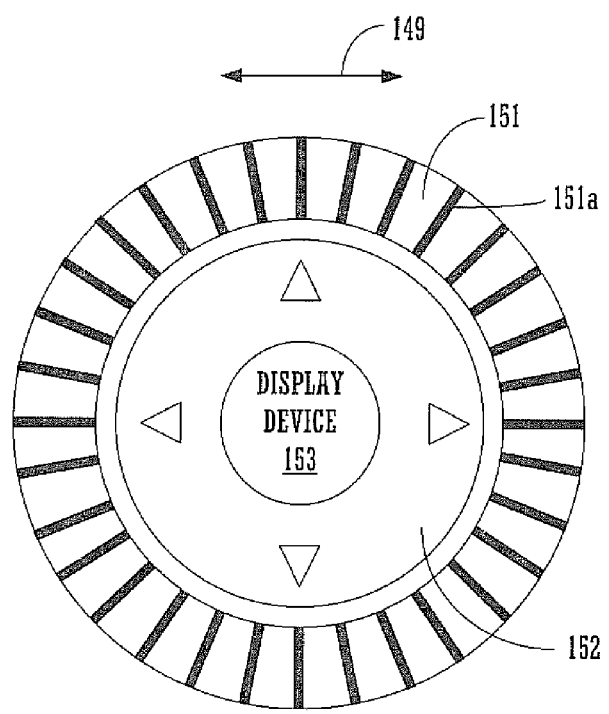
FIG. 5A is an enlarged illustration of an interface dial implementable in a portable electronic device in accordance with one embodiment of the present invention.

FIG. 5A is an enlarged illustration of an interface dial, e.g., interface dial 150 of FIGS. 6A-6E and FIGS. 7A-7F, in one embodiment of the present invention. Interface dial 150 is adapted to be integrated in a portable electronic device, e.g., portable electronic device 100 of FIGS. 6A-6E and 7A-7F.

Interface dial 150 is shown having a rotatable outer ring 151, a multi-way inner portion 152, and a display device 153 disposed within inner portion 152. Outer ring 151 is adapted to be rotated in a clockwise or counter-clockwise direction, as indicated by bi-directional arrow 149. In one embodiment, the rotation of outer ring 151 causes different icons to be displayed in display 153. Outer ring 151, as shown in FIG. 5A, is configured with a grooved surface 151a, for reducing user digit slippage. In another embodiment, outer ring 151 can be configured with a roughed surface, similar to non-slip materials found on bathtub floors and diving boards. Rotation of outer ring 151 in either direction causes a change in the information being displayed in display device 153.

Still referring to FIG. 5A, interface dial 150 is also shown having an inner multi-way portion 152, adapted to provide, in one embodiment, 5-way cursor functionality to interface dial 150. Multi-way portion 152 can be a rocker button. Five-way functionality includes, but is not limited to, directional cursor control. Directional cursor control is, e.g., moving a cursor indicator up, down, left, and right. Five-way functionality also includes cursor selectability, e.g., pressing down on inner multi-way portion 152 thus selecting an image, highlighting data, invoking applications, programs, or functions, similar to mouse clicking and/or stylus contact.

Still referring to FIG. 5A, inner multi-way cursor 152 is shown having a display device 153, centrally disposed therein. Display device 153 provides display functionality to interface dial 150. In one embodiment, display device 153 is a LCD (liquid crystal display). In another embodiment, display device 153 is an LDD (light emitting diode display). It is noted that alternative display technologies can be implemented as display device 153, including, but not limited to, TFT (thin film transistor) display, plasma display, and the like.

Still referring to FIG. 5A, display device 153 of interface dial 150 can, in one implementation, provide a display for images including, but not limited to, icons representing applications, programs, or functions invokable by a portable electronic device. Display device 153 is coupled with outer ring 151, such that when outer ring 151 is rotated, alternative icon images are viewably displayed, as will be shown in FIGS. 7A-7F, following. Display device 153 can reside on a central button that can be depressed and is part of the multi-way 152.

In another implementation, display device 153 of interface dial 150 can display images of alphanumeric characters, so that interface dial 150 can be used in conjunction with security measures, e.g., password protection, implemented in a portable electronic device. For example, with a password protection feature activated, a user can enter the password by rotating outer dial 151 to the appropriate character, and then selecting the character utilizing the cursor selectability functionality. In this way, outer ring 151 can be used much like a combination lock or security device.

In yet another implementation, with display device's 153 alphanumeric display functionality, interface dial 150 can be utilized as a data input device. For example, a user can rotate outer dial 151 to view and select alphabetic and numeric characters for entering test based data, somewhat akin to using a keyboard or software representation of a keyboard or other text input device. Data can be selected by depressing the multi-way 152.

It is noted that categorizing and ordering of the icons and alphanumeric characters that are to be displayed within display device 153 are user definable. A user who utilizes certain functions more frequently can sequentially order the icons representing those functions, thereby reducing the amount of rotation needed to retrieve an appropriate icon. Thus, individual users can customize their interaction with the portable computer system.

Figure 5B:
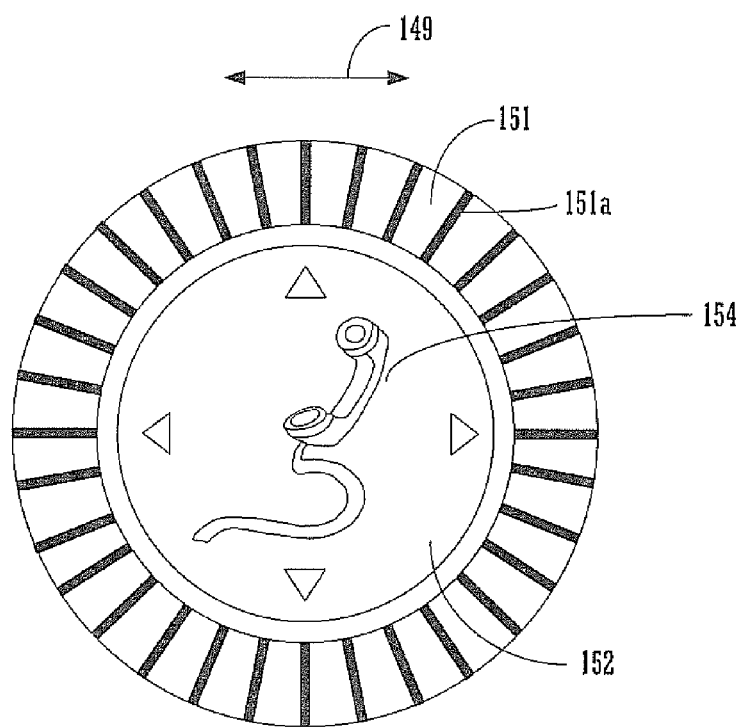
FIG. 5B is an enlarged illustration of another interface dial implementable in a portable electronic device, in accordance with one embodiment of the present invention.

FIG. 5B is an illustration of an interface dial 150, e.g., interface dial 155 shown having an alternatively sized display device 154, in another example of the present invention. Interface dial 155 and display device 154 of FIG. 5B are functionally analogous to interface dial 150 and display device 153 of FIG. 5A. Interface dial 155 is shown having a display device 154 which is disposed within inner multi-way portion 152. In this example, display device 154 has a display region greater in size than display device 150 of FIG. 5A. Shown in display device 154 of interface dial 155 is an icon representing an address book function, such as the icon shown in interface dial 150 of FIG. 7B. By virtue of the larger display region, display device 154 is able to display larger icons.

Figure 6A:
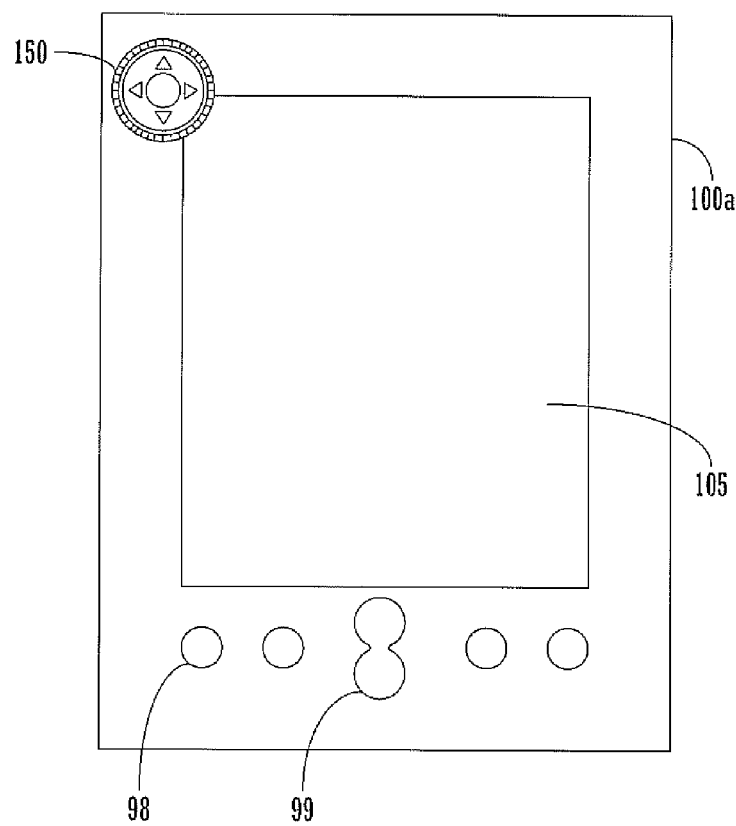
FIG. 6A is an illustration of a portable electronic device having a left side disposed interface dial, in accordance with one embodiment of the present invention.

FIG. 6A is an illustration of a portable computer system 100a configured with an interface dial 150, in one embodiment of the present invention. Alternatively, referring collectively to FIGS. 6A-6E, it is noted that interface dial 155 of FIG. 5B can be analogously implemented. Portable computer system 100a has a display screen 105 integrated therein. Portable computer system 100a also has a plurality of programmable/dedicated buttons 98. Portable computer system 100a also has a dual action button 99 for directing upward and downward movement within display screen 105. In this example, interface dial 150 is disposed upon the left side of portable computer system 100a. This configuration is well suited for users that write right-handed. A right-handed user can use a stylus with their right hand while using holding portable computer system 100a with their left hand and using interface dial 150 with their thumb of their left hand.

Figure 6B:
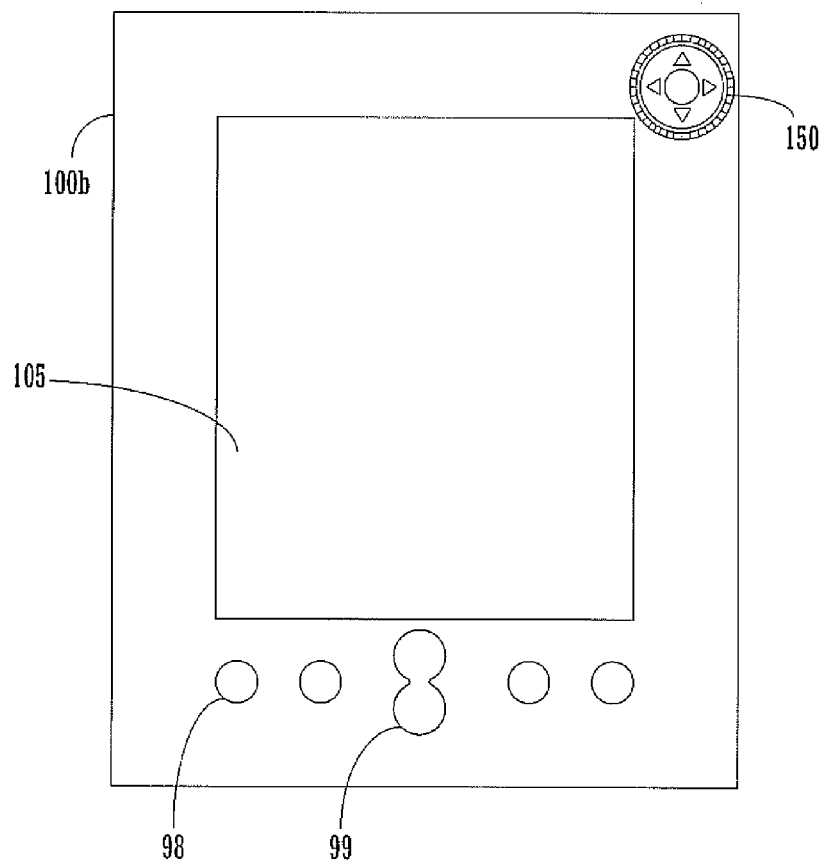
FIG. 6B is an illustration of a portable electronic device having a right side disposed interface dial, in accordance with one embodiment of the present invention.

FIG. 6B is an illustration of another portable computer system 100b, analogous to portable computer system 100a of FIG. 6A. In this example, interface dial 150, analogous to interface dial 150 of FIG. 5A is disposed on the right side of portable computer system 100b. This configuration is well suited for users that write left-handed. A left-handed user can use a stylus with their left hand while holding portable computer system 100b with their right hand and using interface dial 150 with their thumb of their right hand.

Figure 6C:
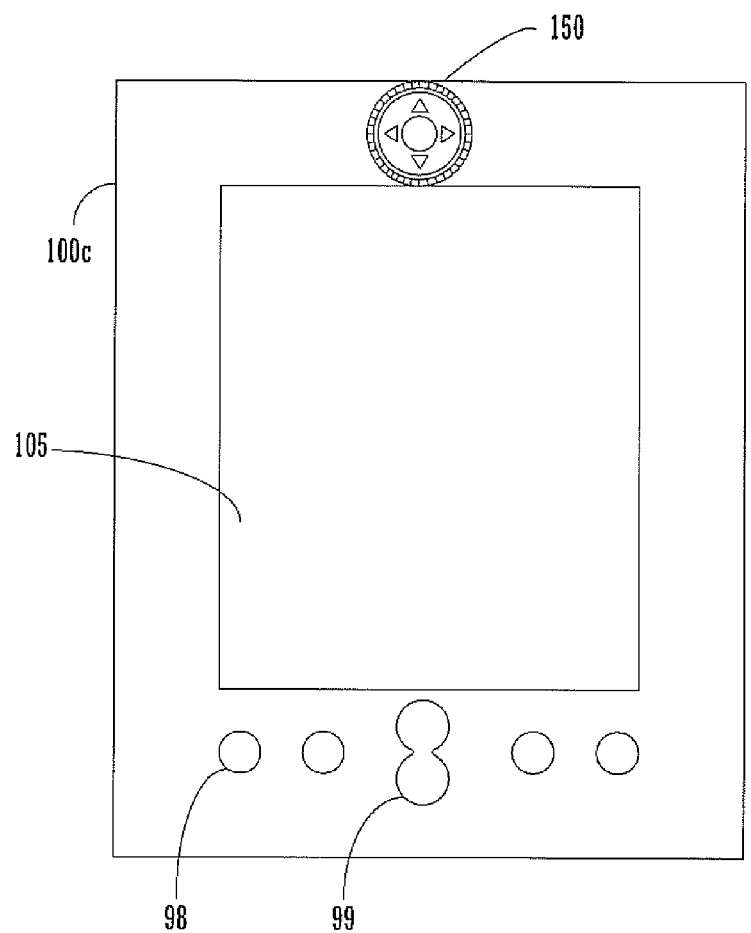
FIG. 6C is an illustration of a portable electronic device having a top-edge disposed interface dial, in accordance with one embodiment of the present invention.

FIG. 6C is an illustration of another portable computer system 100c, analogous to portable computer system 100a of FIG. 6A. In this example, interface dial 150, analogous to interface dial 150 of FIG. 5A, is disposed on the top portion of portable electronic device 100c. As such, this configuration is well suited for either right-handed or left-handed users.

Figure 6D:
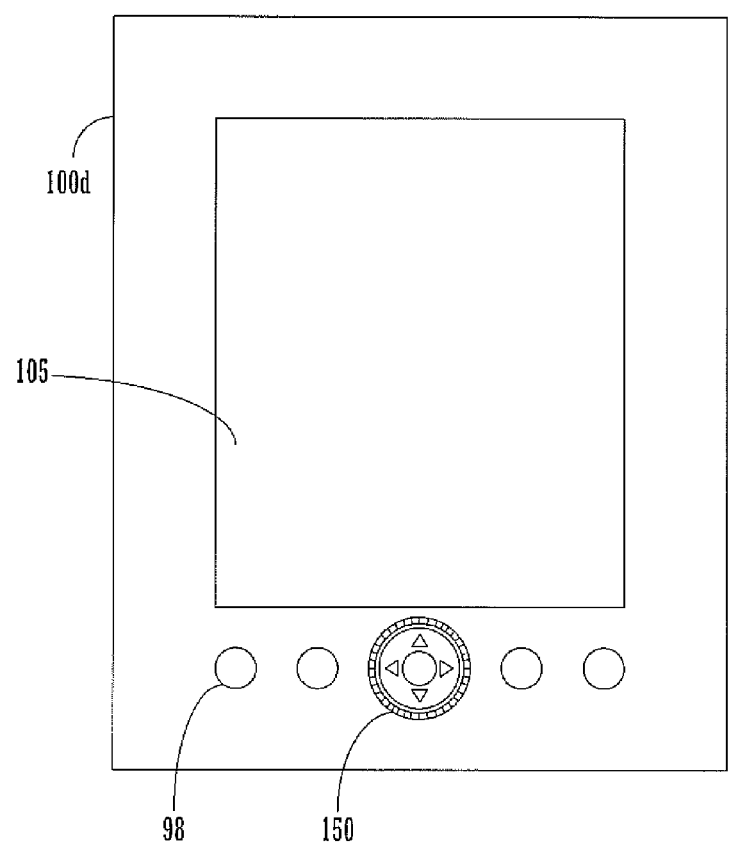
FIG. 6D is an illustration of a portable electronic device having a bottom-edge disposed interface dial, in accordance with one embodiment of the present invention.

FIG. 6D is an illustration of another portable computer system 100d, nearly analogous to portable computer system 100a of FIG. 6A. In this example, interface dial 150, analogous to interface dial 150 of FIG. 5A is disposed on the bottom portion of portable computer system 100d. It is noted that interface dial 150 has replaced dual action button 99, as shown in FIGS. 6A-6C. It is further noted that in another embodiment, interface dial 150 and dual action button 99 can both be disposed upon the bottom of portable computer system 100. In another embodiment, interface dial 150 can be disposed upon the bottom of portable computer system 100d with both dual-action button 99 and programmable/dedicated buttons 98 removed. If only interface dial 150 is present on portable computer system 100d, a size increase in display screen 105 can be realized. Further, by disposing interface dial 150 toward the bottom, this configuration is also well suited for right-handed or left-handed users.

Figure 6E:
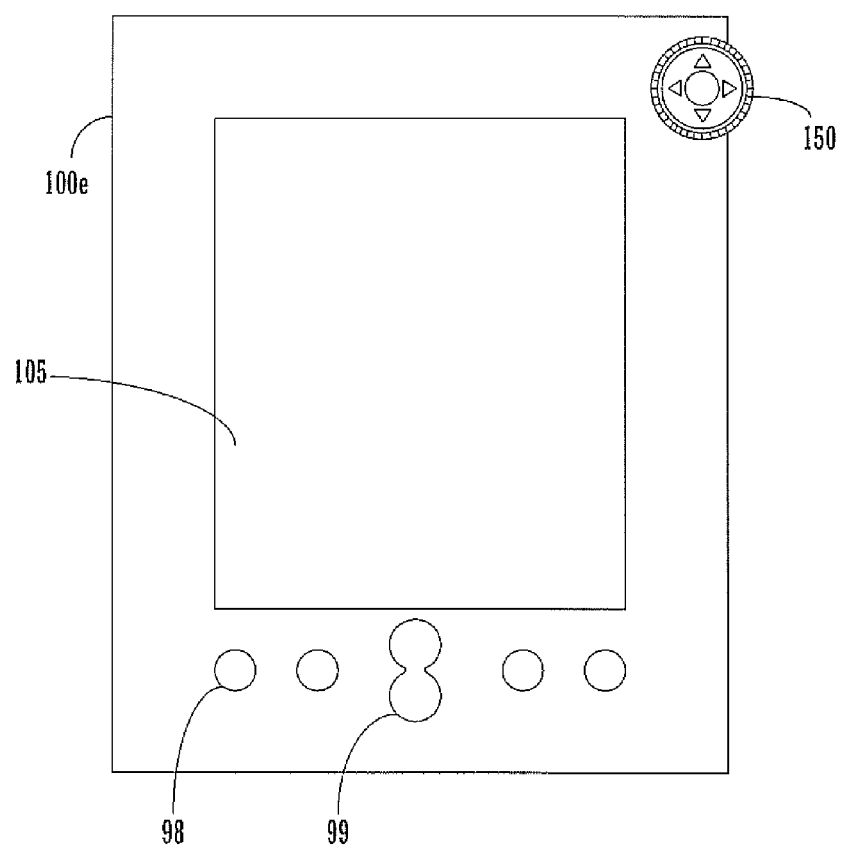
FIG. 6E is an illustration of another portable electronic device having a right-edge disposed interface dial, in accordance with one embodiment of the present invention.

It is noted that although interface dial 150 is shown, in one example, within the contour of portable computer system 100, as seen in FIGS. 6A-6D, in another example, interface dial can be disposed such that it extends beyond the physical contour of a portable computer system 100e, as shown in FIG. 6E.

Dial locations to FIGS. 6A-6E are exemplary only and it is noted that interface dial 150 can be disposed nearly anywhere upon portable computer system 100.

Figure 7A:
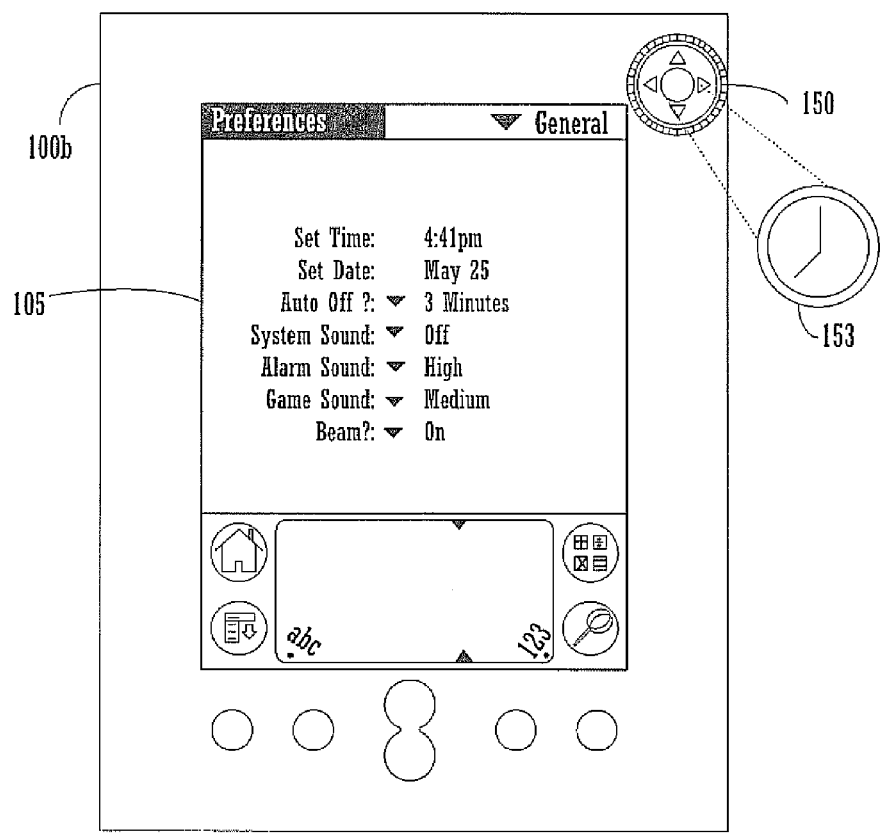
FIG. 7A is an illustration of a portable electronic device, configured with an interface dial with display, being utilized in accordance with one embodiment of the present invention.

FIGS. 7A-7F shows a portable computer system 100 configured with an interface dial 150 disposed on the right side thereof, analogous to portable computer system 100b of FIG. 6B. Alternatively, interface dial 155 of FIG. 5B can be so implemented. FIG. 7A, a user is operating their portable computer system 100b and is editing their preferences, shown in display screen 105, and during editing decides that once finished, they want to check their date book. Advantageously, while editing their preferences with their left hand, the user is able to rotate outer ring 151 of interface dial 150 to display the icon for the date book function, as seen in enlarged display device 153. Subsequent to completion of the editing of their preferences, the user presses down on display device 153, clicking the under button to cause the function, date book, to be activated, shown in FIG. 7B.

Figure 7B:
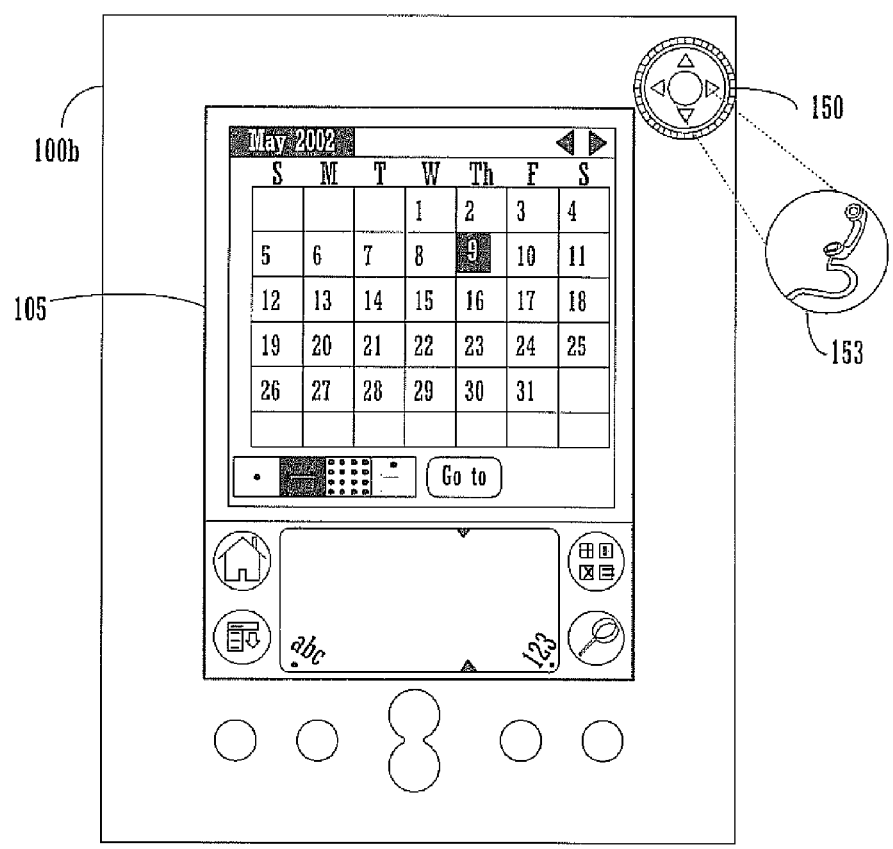
FIG. 7B is an illustration of a portable electronic device, configured with an interface dial with display, being utilized in accordance with one embodiment of the present invention.

Sequentially, in FIG. 7B, function data book, a calendar in this example, is then shown in display screen 105. As the user checks and edits their calendar, the user decides that they will next want to edit their address book. Advantageously, while editing the calendar, the user is able to rotate outer ring 151 of interface dial 150 to display the icon for the address book function, as seen in enlarged display device 153. Subsequent to completion of the editing of their calendar in the data book function, the user presses down on display device 153 clicking the under button to cause the function, address book, to be activated, shown in FIG. 7C.

Figure 7C:
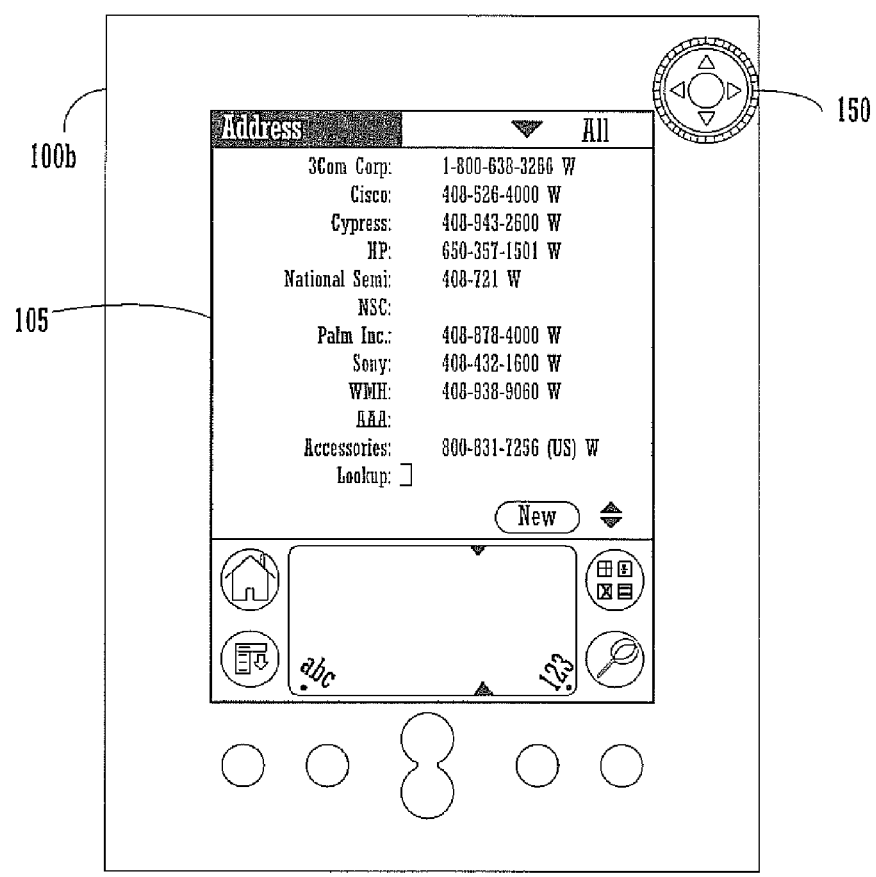
FIG. 7C is an illustration of a portable electronic device, configured with an interface dial with display, being utilized in accordance with one embodiment of the present invention.

Sequentially, in FIG. 7C, function address book is then shown in display screen 105. In this example, the user desired to complete the editing regarding an automobile club to which they now belong. In this instance, the user utilizes the multi-way function incorporated in the inner portion 152 of interface dial 150. By pressing on the sides of inner portion 152, the user can control the movement of a selection indicator to select the automobile club. In this case, interface dial 150 is used as a cursor navigator using display screen 105. Once highlighted, the user presses down on display device 153 and retrieves the information regarding the automobile club, as seen in FIG. 7D.

Figure 7D:
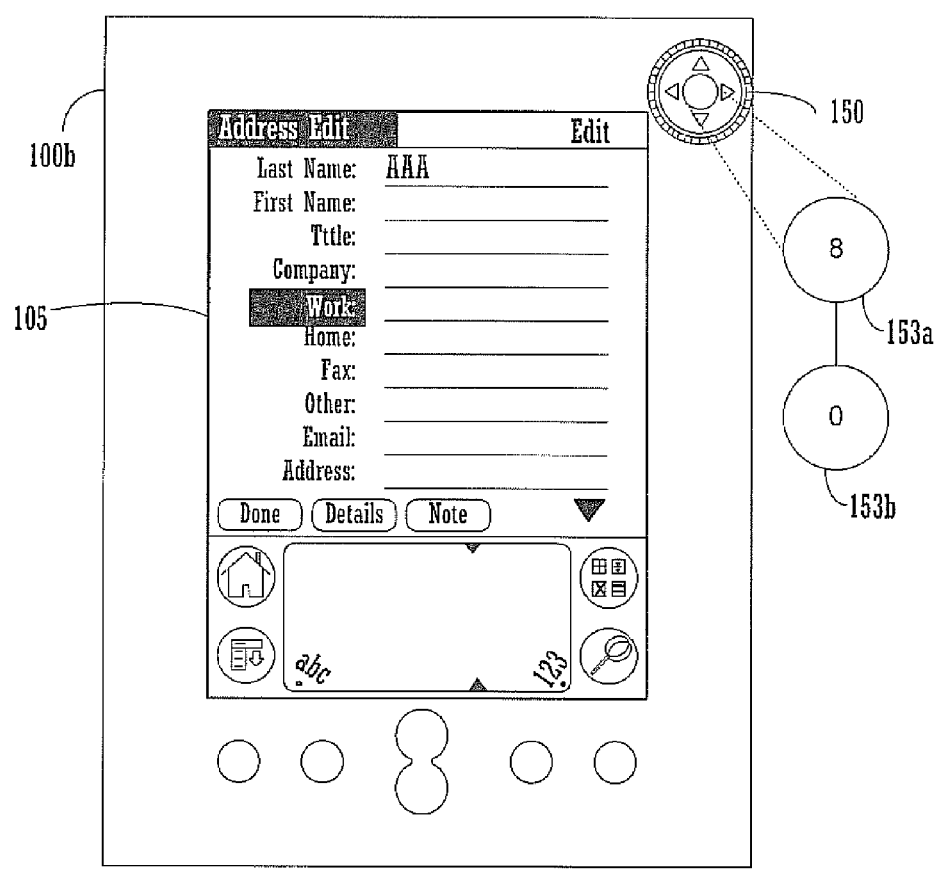
FIG. 7D is an illustration of a portable electronic device, configured with an interface dial with display, being utilized in accordance with one embodiment of the present invention.

Sequentially, in FIG. 7D, the address information regarding the automobile club is shown in display screen 105. The user desires, for example, to insert the automobile club's toll free number. Interface dial 150 can be used as a text input device. By pressing twice on display device 153, alphanumeric characters are now displayed in display device 153. The user rotates outer ring 151 to display the first number, an eight, as shown in enlarged display device image 153-a, then presses down on display device 153 to enter the number. The user then rotates outer ring 151 again to display a zero, as shown in enlarged display device image 153-b, and presses down a first time to enter the first zero and a second time to enter the second zero, now shown in FIG. 7E.

Figure 7E:
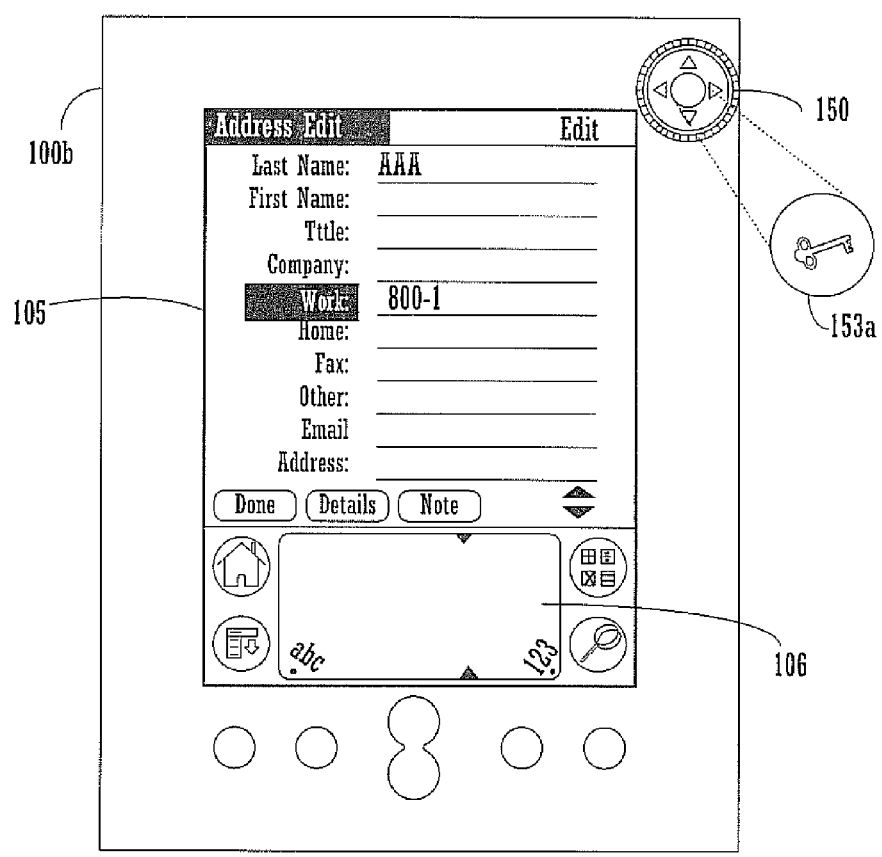
FIG. 7E is an illustration of a portable electronic device, configured with an interface dial with display, being utilized in accordance with one embodiment of the present invention.

Sequentially, in FIG. 7E, the user has decided to utilize digitizer 106 to enter the remainder of the toll free number. The user then presses down twice to activate the display of function icons in display device 153. Advantageously, while utilizing digitizer 106 with their left hand, the user can now rotate outer ring 151 with their right hand thumb, to display a desired function. In this example, the user desires to edit their password for protecting their data, and accordingly needs to access the function, security, as displayed in enlarged display device 153. As the user completes digitizer input of the phone number, the user presses down on display device 153 and activates the function, security, as shown, in FIG. 7F.

Figure 7F:
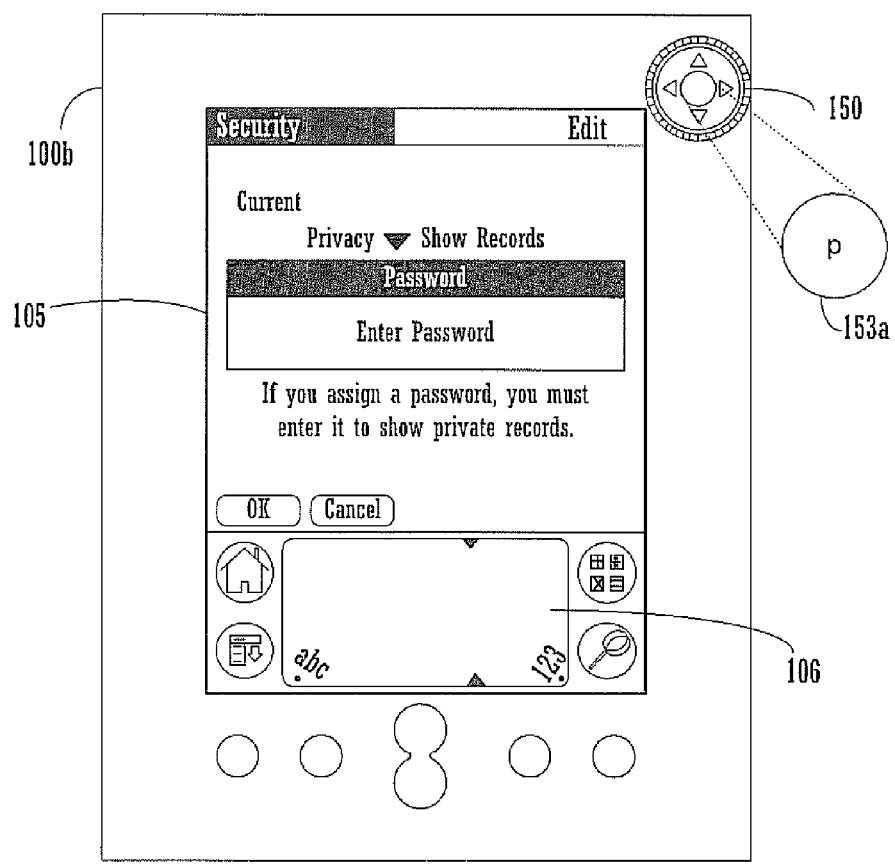
FIG. 7F is an illustration of a portable electronic device, configured with an interface dial with display, being utilized in accordance with one embodiment of the present invention.

Sequentially, in FIG. 7F, the user presses down twice to activate the alphanumeric character display, so as to be able to enter a password, e.g., pol4icy. The use rotates outer dial 151 to display a 'p', the first letter of the password, and once displayed, presses on display device 153 to enter the 'p.' The user would then rotate outer dial 151 to display an 'o', and so on, and so forth.

Figure 8:
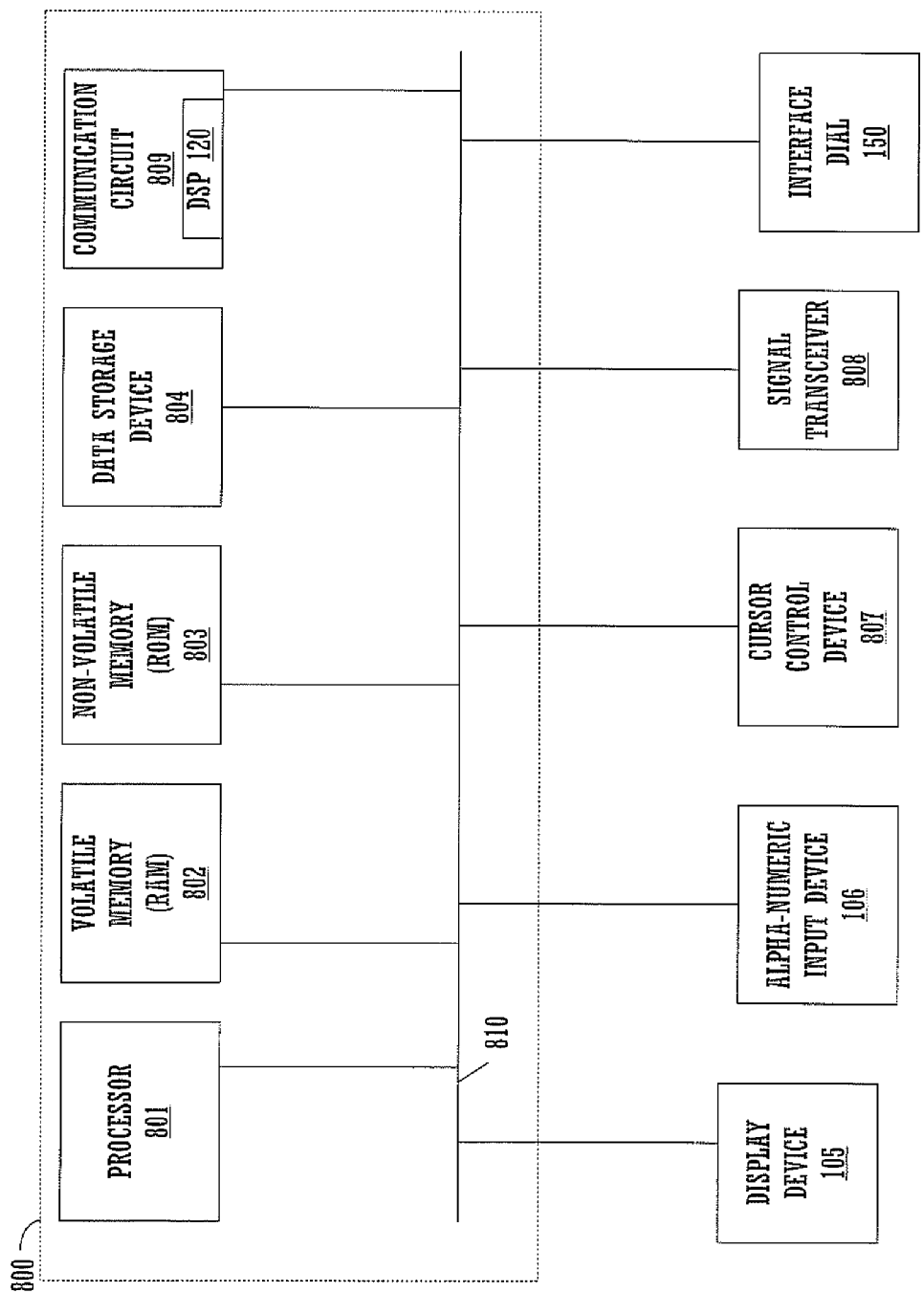
FIG. 8 is a block diagram of components and circuitry of a portable electronic device in accordance with one embodiment of the present invention.

FIG. 8 is a functional block diagram of components and circuitry in a computer system 800, e.g., a portable computer system 100a-e of FIGS. 6A-6E, and FIGS. 7A-7F. Computer system 800 includes an address/data bus 810 for communicating information, a central processor 801 coupled with the bus for processing information and instructions, a volatile memory 802 (e.g., random access memory, RAM) coupled with the bus 810 for storing information and instructions for the central processor 801 and a non-volatile memory 803 (e.g., read only memory, ROM) coupled with the bus 810 for storing static information and instructions for the processor 801. Computer system 100 also includes an optional data storage device 804 coupled with the bus 810 for storing information and instructions. Device 804 can be removable. Computer system 800 also contains display screen 105 coupled to the bus 810 for displaying information to the computer user.

Figure 9A:
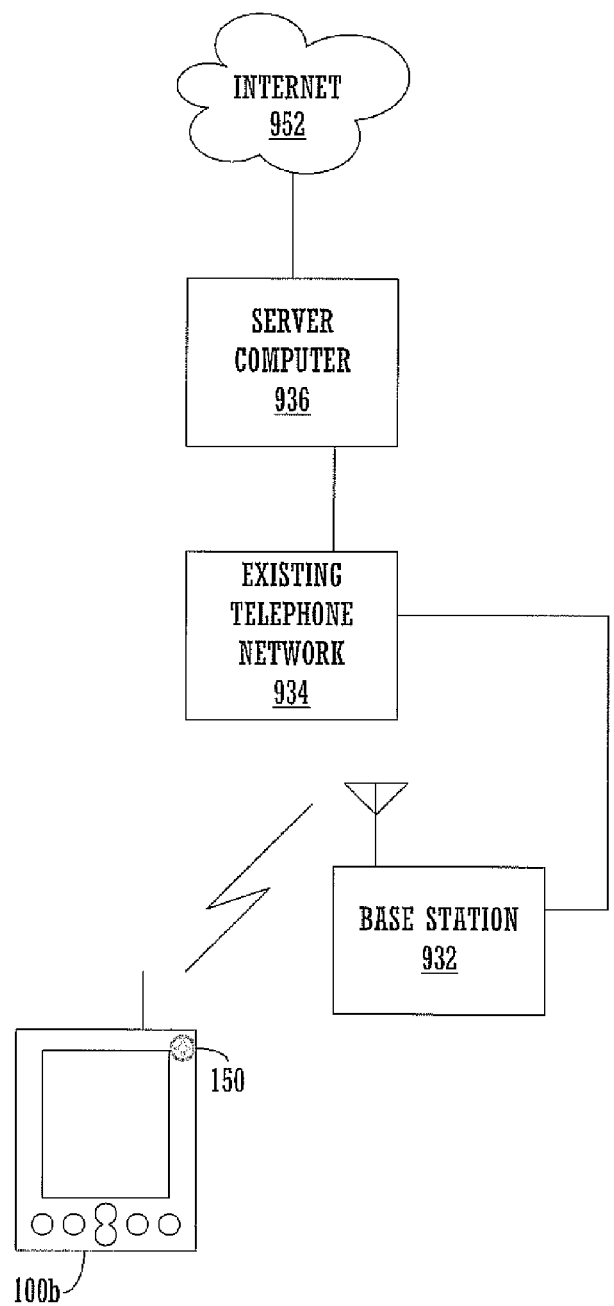
FIG. 9A is a block diagram of an exemplary network environment including a portable computer system, in accordance with one embodiment of the present invention.
Figure 9B:
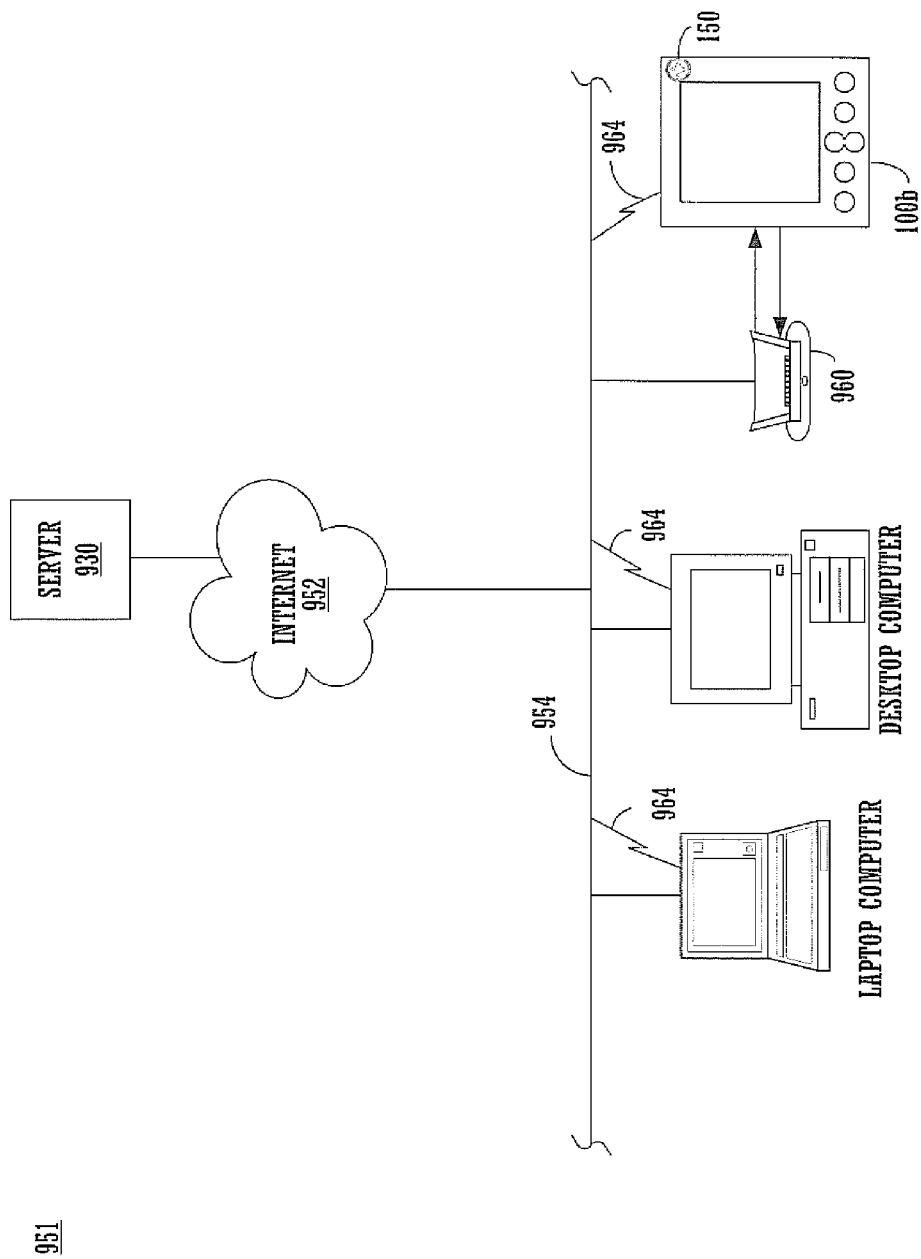
FIG. 9B is a block diagram of a portable computer system connected to other computers and the Internet via a cradle device, in accordance with one embodiment of the present invention.

With reference still to FIG. 8, computer system 800 also includes a signal transceiver device 808, which is coupled to bus 810 for providing a physical communication link between computer system 100, and a network environment (e.g., network environments 950 and 951 of FIGS. 9A and 9B, respectively). As such, signal transmitter/receiver device 808 enables central processor unit 801 to communicate wirelessly with other electronic systems coupled to the network. It should be appreciated that within the present embodiment, signal transmitter/receiver device 808 provides the functionality to transmit and receive information over a wireless communication interface. It should be further appreciated that the present embodiment of signal transceiver device 808 is well suited to be implemented in a wide variety of ways. For example, signal transceiver device 808 could be implemented as a modem.

In one embodiment, computer system 800 includes a communication circuit 809 coupled to bus 810. Communication circuit 809 includes an optional digital signal processor (DSP) 820 for processing data to be transmitted or data that are received via signal transmitter/receiver device 808. Alternatively, processor 801 can perform some or all of the functions performed by DSP 820.

Also included in computer system 800 of FIG. 8 is an optional alphanumeric input device 106 that in one implementation is a handwriting recognition pad ("digitizer") for receiving input. Alphanumeric input device 806 can communicate information and command selections to processor 801. Computer system 800 also includes an optional cursor control or directing device (on-screen cursor control 807) coupled to bus 810 for communicating user input information and command selections to processor 801. In one implementation, on-screen cursor control device 807 is capable of registering a position on display screen 105 where the stylus makes contact. Display screen 105 is suitable for generating graphic images and alphanumeric characters recognizable to the user.

FIG. 8 also has an interface dial 150, e.g., interface dial 150 of FIG. 5A, coupled to bus 810, for enabling enhanced user interaction with computer system 800. Alternatively, interface dial 155 of FIG. 5B can be analogously coupled to bus 810.

FIG. 9A is a block diagram of an exemplary network environment 950 including a portable computer system 100, e.g., portable computer system 100b of FIGS. 6B and 7A-7F, in accordance with one embodiment of the present invention. In one embodiment, portable computer system 100 has the ability to transmit and receive data and information over a wireless communication interface (e.g., a radio interface).

Base station 932 can be both a transmitter and receiver base station, which can be implemented by coupling it into an existing public telephone network 934. Implemented in this manner, base station 932 enables portable computer system 100 to communicate with a server computer system 936, which is coupled by wire to the existing public telephone network 934. Furthermore, server computer system 936 is coupled to the Internet 952, thereby enabling portable computer system 100 to communicate with the Internet 952. When communicating with a Web site over Internet 952, protocols such as CTP (Compact Transport Protocol), WAP (Wireless Markup Protocol), and markup languages such as CML (Compact Markup Language), WML (Wireless Markup Language) which includes HDML (Handheld Device Markup Language), and XML (Extensible Markup Language) can be used by portable computer system 100 in the present embodiment.

It should be appreciated that one of the functions of server 936 is to perform operations over the Internet 952 on behalf of portable computer system 100. For example, proxy server 936 has a particular Internet address and acts as a proxy device for portable computer system 100 over the Internet 952.

It should be further appreciated that other embodiments of a communications network may be utilized in accordance with the present invention. For example, a wireless connection may be made from portable computer system 100 directly to the Internet 952.

The data and information which are communicated between base station 932 and portable computer system 100 are the same type of information and data that can conventionally be transferred and received over a public telephone wire network system. Additionally, in FIG. 9A, the existing telephone network could also be a packet-based network, utilized by some conventional portable computer systems. However, a wireless communication interface is utilized to communicate data and information between portable computer system 100 and base station 932. Furthermore, nearly any wireless network can support the functionality to be disclosed herein.

FIG. 9B illustrates another embodiment of a system 951 that can be used in conjunction with various embodiments of the present invention. System 951 comprises a host computer system which can either be a desktop unit 102, or, alternatively, can be a laptop system 101, as shown. Optionally, one or more host computer systems can be used within system 951. Host computer systems 101 and 102 are shown connected to a communication bus 954, which in one embodiment can be a serial communication bus, but could be of any of a number of well known designs, e.g., a parallel bus, Ethernet Local Area Network (LAN), etc. Optionally, bus 954 can provide communication with the Internet 952 using a number of well-known protocols.

Importantly, bus 954 is also coupled to a cradle 960 for receiving and initiating communication with portable computer system 100*b* of FIG. 6B and FIGS. 7A-7F. Cradle 960 provides an electrical and mechanical communication interface between bus 954 (and anything coupled to bus 954) and the computer system 100*b* for two-way communications. Portable computer system 100*b* may instead be coupled to host computer systems 956 and 958 via a wireless (radio) connection. Computer system 100*b* also contains a wireless infrared communication mechanism 964 for sending and receiving information from other devices. Additionally, in FIG. 9B, the existing telephone network could also be a packet-based network, utilized by some conventional portable computer systems.

With reference to both FIGS. 9A and 9B, it is appreciated that portable computer system 100*b* can be used in a network environment combining elements of networks 950 and 951. That is, portable computer system 100*b* can include both a wireless infrared communication mechanism and a signal (e.g., radio) receiver/transmitter device.

FIG. 10 is a flowchart 1000 of steps performed in accordance with one embodiment of the present invention for utilizing an interface dial with display, e.g., interface dial 150 of FIG. 5*a*, in a portable electronic device, such as portable computer system 100. Alternatively, flowchart 1000 can be analogously performed utilizing interface 155 of FIG. 5B. Flowchart 1000 includes processes of the present invention which, in one embodiment, are carried out by processors and electrical components under the control of computer readable and computer executable instructions. The computer readable and computer executable instructions reside, for example, in data storage features such as computer usable volatile memory (RAM) 802 and/or computer usable non-volatile memory (ROM) 803 and/or data storage device 804 integrated within portable electronic device 100. However, the computer readable and computer executable instructions may reside in any type of computer readable medium. Although specific steps are disclosed in flowchart 1000, such steps are exemplary. That is, the present invention is well suited to performing various other steps or variations of the steps recited in FIG. 10. Within the present embodiment, it should be appreciated that the steps of flowchart 1000 may be performed by software, by hardware or by any combination of software and hardware.

In step 1002 of FIG. 10, an interface dial, e.g., interface dial 150 of FIG. 5A, has an icon displayed in display device 153. The icon represents a link to an executable file of a function operable in portable computer system 100.

In step 1004 of FIG. 10, in response to a rotation, either clockwise or counter-clockwise, received on outer ring 151, an alternative icon is displayed in display device 153, as shown in FIG. 7A.

In step 1006 of FIG. 10, the function associated with the displayed icon is activated in response to receiving an invoking command upon interface dial 150. In one embodiment, the invoking command can be a pressing down of display device 153.

In step 1008 of FIG. 10, cursor navigation is performed by the interface of a user with the multi-way rocker switch integrated with the interface dial.

In conclusion, by providing an interface dial with display for a portable computer system, embodiments of the present invention enable a user to consider and anticipate their subsequent function needs concurrent with an invoked function. Advantageously, this can increase user efficiency. Additionally, the multi-way functionality incorporated therein enables a user to easily and readily interact with an invoked function, and this can increase user satisfaction.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An interface component comprising:
an inner portion comprising a first portion and a second portion, wherein a first interaction with said first portion is operable to initiate a first operation, and wherein a second interaction with said second portion is operable to initiate a second operation;
a display device coupled with said first portion, wherein said display device is operable to display an image; and
an outer ring operable to rotate about said inner portion, wherein said outer ring is further operable to rotate about said display device, and wherein a rotation of said outer ring is operable to alter information displayed on said display device, and
wherein said first portion, said second portion and said outer ring are concentric.

2. The interface component of claim 1, wherein said first portion comprises a central button, and wherein said first interaction comprises a depression of said central button.

3. The interface component of claim 1, wherein said image comprises an icon associated with an executable application, and wherein said first operation is associated with an initiation of said executable application.

4. The interface component of claim 1, wherein said image is associated with an alphanumeric character, and wherein said first operation is associated with a selection of said alphanumeric character.

5. The interface component of claim 1, wherein said second portion comprises a multi-way portion for generating at least one control signal, and wherein each of said at least one control signal corresponds to a respective operation.

6. The interface component of claim 1, wherein said second operation comprises a movement of a cursor displayed on said display device.

7. The interface component of claim 1, wherein a rotation of said outer ring is operable to cause a display of a second image on said display device.

8. The interface component of claim 1, wherein said second portion surrounds said first portion, and wherein said outer ring surrounds said second portion.

9. A portable electronic device comprising:
a processor;
a memory; and
an interface component comprising:
an inner portion comprising a first portion and a second portion, wherein a first interaction with said first portion is operable to initiate a first operation, and wherein a second interaction with said second portion is operable to initiate a second operation;

a display device coupled with said first portion, wherein said display device is operable to display an image; and an outer ring operable to rotate about said inner portion, wherein said outer ring is further operable to rotate about said display device, and wherein a rotation of said outer ring is operable to alter information displayed on said display device, and wherein said first portion, said second portion and said outer ring are concentric.

10. The portable electronic device of claim 9, wherein said first portion comprises a central button, and wherein said first interaction comprises a depression of said central button.

11. The portable electronic device of claim 9, wherein said image comprises an icon associated with an executable application, and wherein said first operation is associated with an initiation of said executable application.

12. The portable electronic device of claim 9, wherein said image is associated with an alphanumeric character, and wherein said first operation is associated with a selection of said alphanumeric character.

13. The portable electronic device of claim 9 further comprising:
a second display device, and
wherein a third interaction with said inner portion is operable to initiate a third operation selected from a group consisting of a selection of information displayed on said second display device and an alteration of information displayed on said second display device.

14. The portable electronic device of claim 9, wherein said second portion comprises a multi-way portion for generating at least one control signal, and wherein each of said at least one control signal corresponds to a respective operation.

15. The portable electronic device of claim 9, wherein said second operation comprises a movement of a cursor displayed on said display device.

16. The portable electronic device of claim 9, wherein a rotation of said outer ring is operable to cause a display of a second image on said display device.

17. The portable electronic device of claim 9, wherein said second portion surrounds said first portion, and wherein said outer ring surrounds said second portion.

18. A portable electronic device comprising:
a processor;
a memory;
a first display device operable to display first information; and
an interface component comprising:
an inner portion;
a second display device coupled with said inner portion, wherein said second display device is operable to display second information;
an outer ring operable to rotate about said inner portion wherein said outer ring is further operable to rotate about said second display device, and
wherein said inner portion is operable to enable a user to interact with said first information displayed on said first display device and said second information displayed on said second display device.

19. The portable electronic device of claim 18, wherein said inner portion comprises a central button, wherein a first interaction with said central button is operable to select said first information displayed on said first display device, and wherein a second interaction with said central button is operable to select said second information displayed on said second display device.

20. The portable electronic device of claim 18, wherein said second information comprises an icon associated with an application stored in said memory, and wherein an interaction with said inner portion is operable to initiate an execution of said application using said processor.

21. The portable electronic device of claim 18, wherein said second information is associated with an alphanumeric character, and wherein an interaction with said inner portion is operable to select said alphanumeric character.

22. The portable electronic device of claim 18, wherein said inner portion comprises a multi-way portion for generating at least one control signal, and wherein each of said at least one control signal corresponds to a respective operation.

23. The portable electronic device of claim 22, wherein said multi-way portion is further operable to move a cursor.

24. The portable electronic device of claim 18, wherein a rotation of said outer ring is operable to alter said second information displayed on said second display device.

25. The portable electronic device of claim 18, wherein said inner portion comprises a central button and a multi-way portion, wherein said multi-way portion surrounds said central button, and wherein said outer ring surrounds said multi-way portion.

* * * * *